United States Patent [19]

Back

[11] Patent Number: 5,040,804
[45] Date of Patent: Aug. 20, 1991

[54] LIP SEAL WITH UNITIZED SUPPORT RING

[75] Inventor: Anthony C. Back, Slough, United Kingdom

[73] Assignee: John Crane UK Limited, United Kingdom

[21] Appl. No.: 483,563

[22] Filed: Feb. 22, 1990

[30] Foreign Application Priority Data

Feb. 28, 1989 [GB] United Kingdom ............. 8904517.3

[51] Int. Cl.[5] ............................................. F16J 15/32
[52] U.S. Cl. ........................................ 277/48; 277/50; 277/53; 277/136; 277/152; 277/188 R
[58] Field of Search ............ 277/27, 35, 37, 44, 277/45, 47–50, 53, 136, 137, 142, 143, 152, 153, 174, 188 R

[56] References Cited

U.S. PATENT DOCUMENTS

| | | | |
|---|---|---|---|
| 2,350,697 | 6/1944 | Petch | 277/49 |
| 2,565,701 | 8/1951 | Stewart | 277/50 |
| 2,596,174 | 5/1952 | Reich | 277/49 |
| 3,069,174 | 12/1962 | Skinner | 277/48 |
| 3,188,098 | 6/1965 | Skinner, Sr. | 277/153 |
| 3,874,677 | 4/1975 | Ludwig | 277/27 |
| 4,531,748 | 7/1985 | Jackowski . | |
| 4,739,569 | 3/1988 | Müller et al. | 277/27 |
| 4,832,350 | 5/1989 | Orlowski | 277/53 |
| 4,836,694 | 6/1989 | Schmehr et al. | 277/174 X |

FOREIGN PATENT DOCUMENTS

| | | | |
|---|---|---|---|
| 0157904 | 8/1984 | European Pat. Off. . | |
| 145875 | 6/1988 | Japan | 277/152 |
| 806963 | 2/1981 | U.S.S.R. | 277/152 |
| 1554406 | 10/1979 | United Kingdom . | |
| 2083873 | 3/1982 | United Kingdom | 277/50 |
| 2101238 | 7/1982 | United Kingdom . | |

*Primary Examiner*—William A. Cuchlinski, Jr.
*Assistant Examiner*—Scott Cummings
*Attorney, Agent, or Firm*—Davis, Bujold & Streck

[57] ABSTRACT

A seal includes a seal assembly associated with a housing, said seal assembly having an annular sealing element which is located both axially and radially between a retaining ring and a support ring, the sealing element sealingly engaging the retaining ring and having a first lip formation which is engageable, in response to fluid pressure being applied thereto, with a shaft to provide a fluid tight seal therewith, a seal being provided between the retaining ring and housing.

16 Claims, 1 Drawing Sheet

LIP SEAL WITH UNITIZED SUPPORT RING

BACKGROUND TO THE INVENTION

The present invention relates to a seal for a pair of relatively rotatable components.

UK Patent No. 1554406 discloses a secondary seal which will provide a temporary seal under running conditions or a seal capable of holding pressure over longer periods under non-running conditions, in the event that a primary sealing device, for example a mechanical face seal, should fail.

The seal described in that patent, has an inwardly directed lip which is a close or interference fit on the rotary component, for example shaft, but is only forced into sealing engagement with the rotary component upon exposure to fluid under pressure. An outwardly directed lip is deflected to a substantial degree by engagement with the stationary component, for example a housing, to provide a permanent seal therebetween.

Because of the need to deflect the outer lip to a substantial degree, against the direction of movement of the seal as it is located between the rotary and non-rotary components, such seals are difficult to fit. Furthermore, the seal has little radial compliance and is unable to tolerate variations in concentricity between the rotary and non-rotary components.

The present invention provides an improved seal which will mitigate these problems.

SUMMARY OF THE INVENTION

According to one aspect of the present invention a seal comprises a seal assembly associated with one of a pair of relatively rotatable components, said seal assembly having an annular sealing element which is located both axially and radially between a retaining ring and a support ring, the sealing element having means to provide a fluid tight seal with the retaining ring and a first lip formation which is engageable, in response to fluid pressure being applied thereto, with the other component to provide a fluid tight seal therewith, means being provided to seal the retaining ring with respect to its associated component.

According to a preferred embodiment of the invention the retaining ring is cylindrical with a flange at one end, the flange extending radially towards said other component, the sealing element has a second lip formation which extends radially in the opposite direction to the first lip formation, the sealing element being located with respect to the retaining ring so that it abuts the flange and the second lip formation is deflected away from the flange by engagement with the cylindrical surface of the retaining ring. The seal assembly described above may be preassembled, the sealing element first being inserted into the retaining ring from the end remote from the flange portion thereof. As the second lip formation is deflected away from the flange portion, that is with the direction of movement of the sealing element, insertion will be eased.

A flange portion may be provided on the support ring, this flange formation extending towards the retaining ring to provide axial containment of the sealing element. The flange portion of the support ring may advantageously extend beyond the end of the retaining ring when the sealing element engages the flanged end of the retaining ring. The external diameter of the flange portion of the support ring may be contoured and the adjacent end of the retaining ring correspondingly deformed so that it will engage the support ring to trap the support ring and sealing element whilst permitting axial movement thereof within the retaining ring.

The assembly described above is located with respect to its associated component, in an annular recess defined between two portions of the component. A radial separation may be provided between the cylindrical surface of the annular recess and the retaining ring so that the seal assembly is free to float radially. The annular recess is preferably dimensioned such that the flange of the retaining ring will engage one wall of the recess while the remote end of the support ring will engage the opposed wall of the recess. Resilient means may be interposed between a radial face of the support ring and an opposed face of the sealing element to bias the sealing element into engagement with the flange of the retaining ring and the flange of the retaining ring into sealing engagement with the adjacent wall of the recess. Means may also be provided to prevent rotation of the seal assembly with respect to its associated component. This means may permit relative radial movement of the seal assembly.

BRIEF DESCRIPTION OF THE DRAWINGS

Various embodiments of the invention are now described, by way of example only, with reference to the accompanying drawings, in which.

DESCRIPTION OF A PREFERRED EMBODIMENT

Figure 1:
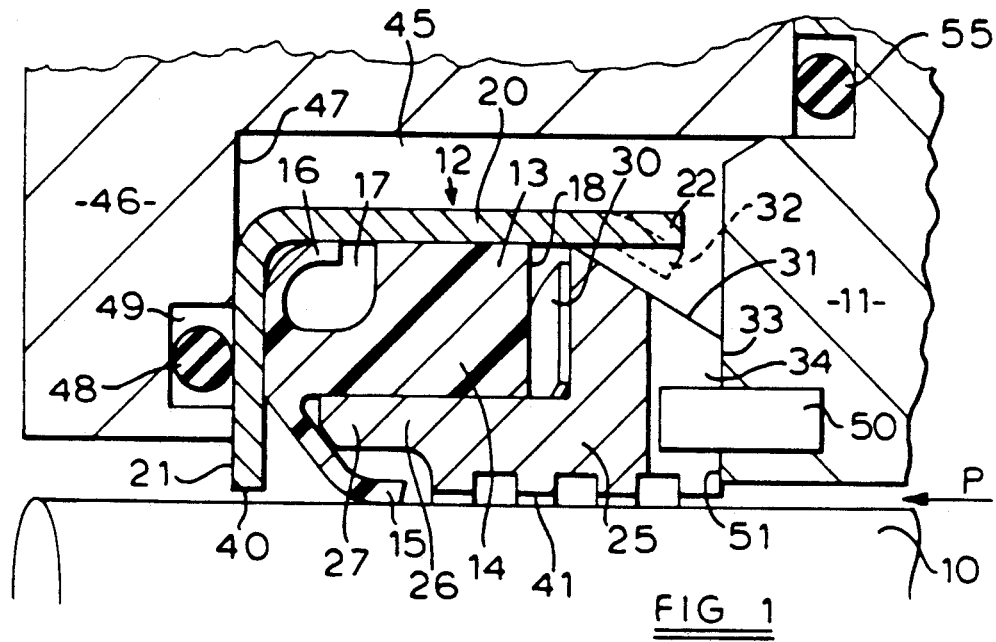
FIG. 1 is a partial cross-sectional elevation of a seal in accordance with the present invention.

The seal illustrated in FIG. 1 provides an emergency seal between a shaft 10 and housing 11.

A seal assembly 12 includes an annular sealing element 13 made of PTFE. The sealing element 13 has a body portion 14. From one end of the body portion 14 a first lip formation 15 extends inwardly and towards the other end of body portion 14 and second lip formation 16 extends radially outwardly. A recess 17 is provided in the body portion 14 adjacent to lip formation 16.

The sealing element 13 is located within a retaining ring 20 which is cylindrical with a radially inwardly directed flange 21 at one end. The cylindrical portion of retaining ring 20 is of slightly larger diameter than the body portion 14 of sealing element 13. The sealing element 13 is inserted into the retaining ring 20 from the open end 22 thereof, the end of the sealing ring defining lips 15 and 16 leading, so that lip 16 is deflected into the recess 17 and sealingly engages the retaining ring 20.

A support ring 25 has a spigot portion 26 which locates within the sealing element 13 from the end 18 thereof remote from the lips 15 and 16. The spigot portion 26 extends towards lip 15 and the end 27 is chamfered to provide a clearance therebetween. Axially clear of the sealing element 13, the support ring 25 is of enlarged diameter and radially overlaps the body portion 14 of sealing element 13.

A wave spring 30 is interposed between the face 18 of sealing element 13 and the opposed radial face of the support ring 25. The circumferential face 31 of the enlarged diameter portion of support ring 25 is chamfered and ears 32 at the end 22 of retaining ring 20 are turned inwardly to engage the chamfered face 31, to retain the sealing element 13 and support ring 25 in the retaining ring 20. The sealing element 13, support ring 25 and retaining ring 20 are dimensioned such that when the ears 32 engage chamfered face 31, the sealing element 13 will be biased, by the spring 30, into engagement with the flange portion 21 of the retaining ring 20.

The end face 33 of the support ring 25 extends rearwardly of the end 22 of retaining ring 20 when the ears 32 engage the chamfered face 31. One or more angularly spaced radial grooves 34 are provided in the end face 33 of the support ring 25.

The seal assembly 12 is mounted on shaft 10, the lip 15 being a light interference fit on the shaft 10 and the internal diameters 40 and 41 of the flange formation 21 and support ring 25 respectively, having close clearances with the shaft 10 the internal diameter 41 of the support ring 25 having a series of circumferential grooves. The seal assembly 12 is located in an annular recess 45 defined between the housing 11 and a clamping plate 46. The internal diameter of annular recess 45 is greater than the external diameter of retaining ring 20, so that the seal assembly 12 is free to float radially to accommodate variations in concentricity of the shaft 10.

The recess 45 is narrower than the free axial length of the seal assembly 12, so that as the clamping plate 46 is tightened up, the support ring 25 will be compressed into the retaining ring 20 and the spring 30 will react to bias the flange 21 of retaining ring 20 into engagement with the adjacent wall 47 of recess 45. An elastomeric O-ring 48 engages in groove 49 in wall 47 to provide a fluid tight seal between the wall 47 and flange 21. A number of pins 50 corresponding to the number and angular position of grooves 34, are provided in the wall 51 defined by housing 11 and these pins 50 engage in the radial grooves 34 in the support ring 25. A further O-ring 55 provides a seal between the housing 11 and clamping plate 46.

Under normal operation, the lip 15 will only engage the shaft 10 lightly and will not consequently be subject to excessive wear. Only upon exposure of fluid under pressure in the direction of arrow P, for example upon failure of a primary seal positioned upstream, will the lip 15 be forced down onto the shaft 10 to form a fluid tight seal therewith. The lip 16 and the ring 48 will prevent leakage of fluid round the back of the seal.

Engagement of the pins 50 and grooves 34 will prevent rotation of the seal assembly 12 whilst permitting radial float thereof. As the seal assembly is free to float radially the internal diameters 40 and 41 of the flange 21 and support ring 25 may be very close to the surface of the shaft 10. The flange 21 will consequently prevent lip 15 from being extruded past flange 21 when subject to high pressure. The support ring 25 will also act as a close clearance throttle bush to reduce leakage.

Figure 2:
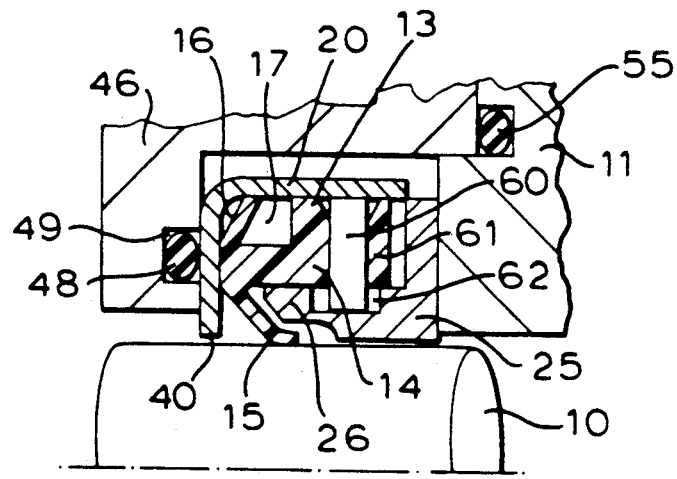
FIG. 2 is a cross-sectional elevation illustrating various modifications to the seal illustrated in FIG. 1.
Figure 2:
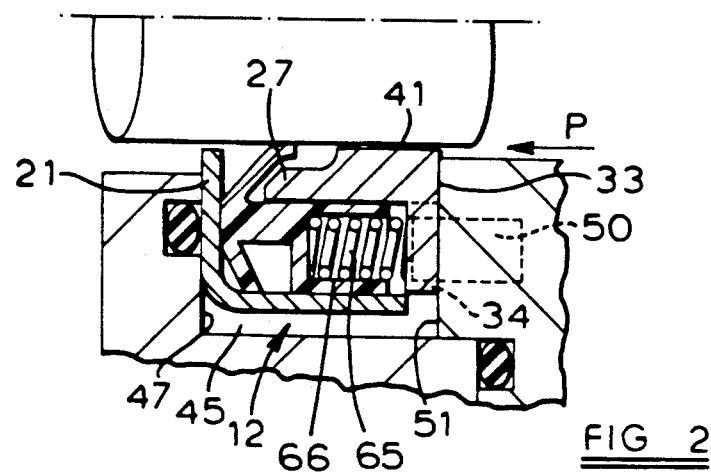

In the seal illustrated in FIG. 2 the wave spring 30 is replaced by a series of angularly spaced helical compression springs 65 which are located in longitudinal bores 66 in the sealing element 13 and act against the opposed radial face of support ring 25. One or more drive pins 60 are also provided in radial bores 61 and engage in axially extending closed radial bores 62 in the support ring 25. The drive pins 60 will transmit radial forces to the support ring 25 thereby preventing rotation of the sealing element 13 and will also locate the support ring 25 axially of the sealing element 13 and retaining ring 20, thereby avoiding the need to form ears 32 at the end of the retaining ring 20. The inner surface 41 of the support ring 25 is also plain rather than castellated as in the previous embodiment. One or more drive pins 50 engaging in radially extending slots 34 in the support ring 25 may be provided to prevent relative rotation between the support ring 25 and housing 11.

Various modifications may be made without departing from the invention. For example, while in the above embodiments the seal assemblies are located on the housing and lip 15 engages the shaft, the seal assembly may alternatively be located in a recess on the rotary component for rotation therewith and lip 15 engage an opposed surface of the stationary component. Although the sealing element described above is made of PTFE, other suitable materials, for example other plastic or elastomeric materials, may be used. Where the material of the sealing element is itself resilient, compression of the sealing element by the support ring may bias the retaining ring into sealing engagement with the adjacent wall of the recess.

I claim:

1. A seal for producing a fluid-tight seal between a first component and a second component, the first and second components being relatively rotatable, the seal comprising a seal assembly located within an annular groove in the first component, the seal assembly having an annular sealing element which is located both axially and radially between a retaining ring and a support ring, the sealing element having means to provide a fluid-tight seal with the retaining ring and a first lip formation which is engageable, in response to fluid pressure being applied thereto, with the second component to provide a fluid-tight seal therebetween, the end of the support ring remote from the sealing element extending beyond the adjacent end of the retaining ring, the retaining ring engaging one wall of the recess while the support ring engages the opposite wall of the recess, the seal assembly being compressed axially between the walls of the recess to apply a resilient axial load which will maintain the retaining ring in sealing engagement with the wall of the recess engaged thereby.

2. A seal according to claim 1 in which the means for providing a fluid tight seal with the retaining ring is a second lip formation which extends radially in the opposite direction to the first lip formation.

3. A seal according to claim 2 in which the retaining ring is cylindrical with a flange at one end, the sealing element being located with respect to the retaining ring so that it abuts the flange and the second lip formation is deflected away from the flange by engagement of the cylindrical surface of the retaining ring.

4. A seal according to claim 3 in which the end of the retaining ring remote from the flange is deformed to engage the support ring and limit axial movement of the support ring with respect to the retaining ring, thereby trapping the sealing element in the retaining ring.

5. A seal according to claim 1 in which resilient means acts axially between the support ring and the sealing element to bias the retaining ring into engagement with the adjacent wall of the annular recess.

6. A seal according to claim 1 in which an O-ring is provided in an annular groove in the wall of the recess engaged by the retaining ring, in order to provide a seal therebetween.

7. A seal according to claim 1 in which a clearance is provided between the cylindrical face of the recess and the retaining ring thereby permitting radial movement of the seal assembly.

8. A seal according to claim 1 in which means is provided to prevent rotation of the seal assembly with respect to the associated component.

9. A seal according to claim 8 in which one or more formations on the end of the support ring remote from the sealing element engage corresponding formations on the adjacent wall of the annular recess, in order to prevent relative rotation therebetween.

10. A seal according to claim 9 in which the formations on the support ring and the corresponding formations on the wall of the annular recess will permit relative radial movement of the seal assembly with respect to the associated component.

11. A seal according to claim 10 in which one or more pins are located in the wall of the recess and engage in a corresponding number of radial grooves in the end of the support ring.

12. A seal according to claim 1 in which the flange formation of the retaining ring extends into close proximity to the second component to prevent extrusion of said first lip formation when subjected to high pressure differentials.

13. A seal according to claim 1 in which means is provided to prevent rotation of the sealing element relative to the support ring while permitting relative axial movement therebetween.

14. A seal according to claim 13 in which pins in one of the sealing element or support ring engage in axially elongate apertures in the other of said sealing element or support ring.

15. A seal according to claim 1 in which the support ring extends into close proximity with the opposed surface of the second component, thereby providing a close clearance throttle bush which will control leakage.

16. A seal according to claim 15 in which the surface of the support ring opposed to the second component is formed with one or more circumferential grooves.

* * * * *